(12) United States Patent
Uno

(10) Patent No.: US 10,909,413 B2
(45) Date of Patent: Feb. 2, 2021

(54) INFORMATION-PROCESSING APPARATUS, CONTROL METHOD, AND NON-TRANSITORY COMPUTER READABLE MEDIUM

(71) Applicant: CANON KABUSHIKI KAISHA, Tokyo (JP)

(72) Inventor: Yurie Uno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 15/812,479

(22) Filed: Nov. 14, 2017

(65) Prior Publication Data

US 2018/0144210 A1    May 24, 2018

(30) Foreign Application Priority Data

Nov. 18, 2016 (JP) ................. 2016-225438

(51) Int. Cl.
*G06K 9/62* (2006.01)
*G06K 9/72* (2006.01)
*H04N 1/32* (2006.01)
*G06F 3/0482* (2013.01)

(52) U.S. Cl.
CPC ............. *G06K 9/6201* (2013.01); *G06K 9/72* (2013.01); *H04N 1/32101* (2013.01); *H04N 1/32128* (2013.01); *G06F 3/0482* (2013.01)

(58) Field of Classification Search
CPC ....................................................... G06K 9/72
See application file for complete search history.

(56) References Cited

U.S. PATENT DOCUMENTS

| 9,456,170 | B1 * | 9/2016 | Miller | ....................... G06K 9/72 |
| 2002/0075323 | A1 * | 6/2002 | O'Dell | ............... G01C 21/3647 715/835 |
| 2009/0273663 | A1 * | 11/2009 | Yoshida | ............... H04N 9/8047 348/43 |
| 2012/0288190 | A1 * | 11/2012 | Tang | ..................... G06F 40/103 382/165 |

FOREIGN PATENT DOCUMENTS

JP        2006-350550 A      12/2006

* cited by examiner

*Primary Examiner* — Edward Park
(74) *Attorney, Agent, or Firm* — Cowan, Liebowitz & Latman, P.C.

(57) ABSTRACT

An information-processing apparatus includes: an image acquisition unit configured to acquire information on a predetermined item as image information from an image file; a comparison unit configured to compare the image information with text data relating to the image file; and a notification unit configured to perform a notification in a case where a result of the comparison indicates a mismatch between the image information and the text data.

17 Claims, 17 Drawing Sheets

FIG. 5

301 IMAGE AND TEXT INFORMATION TABLE

| IMAGE ID (302) | IMAGE DATA (303) | RELATED TEXT (304) |
|---|---|---|
| IMAGE ID 1 | IMAGE DATA 1 | RELATED TEXT 1 |
| IMAGE ID 2 | IMAGE DATA 2 | RELATED TEXT 2 |
| IMAGE ID 3 | IMAGE DATA 3 | RELATED TEXT 3 |
| IMAGE ID 4 | IMAGE DATA 4 | RELATED TEXT 4 |
| IMAGE ID 5 | IMAGE DATA 5 | RELATED TEXT 5 |
| IMAGE ID 6 | IMAGE DATA 6 | RELATED TEXT 6 |
| IMAGE ID 7 | IMAGE DATA 7 | RELATED TEXT 7 |
| IMAGE ID 8 | IMAGE DATA 8 | RELATED TEXT 8 |
| IMAGE ID 9 | IMAGE DATA 9 | RELATED TEXT 9 |
| ... | ... | ... |

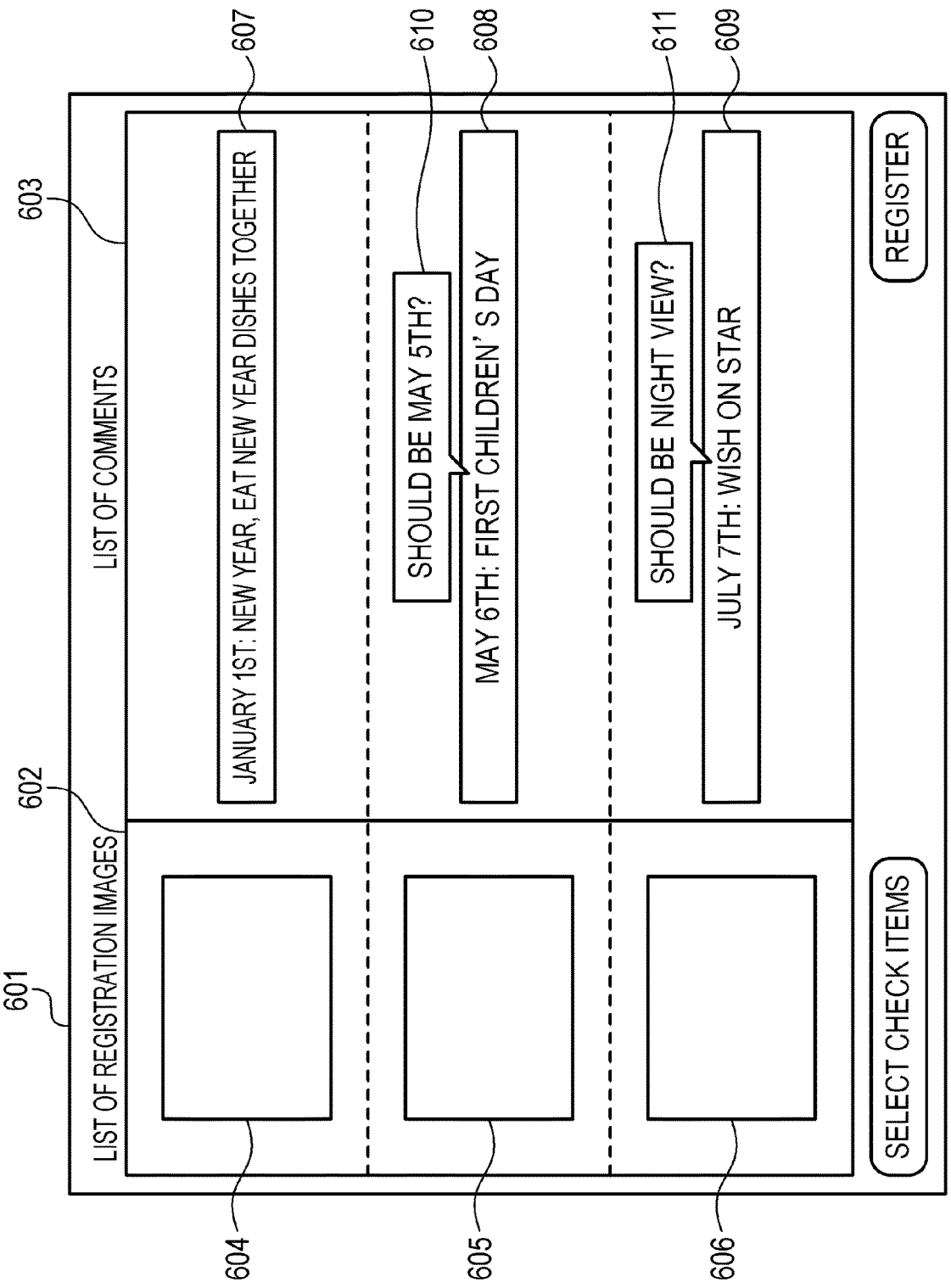

FIG. 11

801 IMAGE INFORMATION TABLE

| IMAGE ID (802) | IMAGE DATA (803) | IMAGE NAME (804) | SHOOTING DATE AND TIME (805) | SHOOTING LOCATION (806) | OBJECT NAME (807) |
|---|---|---|---|---|---|
| IMAGE ID 1 | IMAGE DATA 1 | IMAGE NAME 1 | SHOOTING ... 1 | SHOOTING ... 1 | OBJECT NAME 1 |
| IMAGE ID 2 | IMAGE DATA 2 | IMAGE NAME 2 | SHOOTING ... 2 | SHOOTING ... 2 | OBJECT NAME 2 |
| IMAGE ID 3 | IMAGE DATA 3 | IMAGE NAME 3 | SHOOTING ... 3 | SHOOTING ... 3 | OBJECT NAME 3 |
| IMAGE ID 4 | IMAGE DATA 4 | IMAGE NAME 4 | SHOOTING ... 4 | SHOOTING ... 4 | OBJECT NAME 4 |
| IMAGE ID 5 | IMAGE DATA 5 | IMAGE NAME 5 | SHOOTING ... 5 | SHOOTING ... 5 | OBJECT NAME 5 |
| IMAGE ID 6 | IMAGE DATA 6 | IMAGE NAME 6 | SHOOTING ... 6 | SHOOTING ... 6 | OBJECT NAME 6 |
| IMAGE ID 7 | IMAGE DATA 7 | IMAGE NAME 7 | SHOOTING ... 7 | SHOOTING ... 7 | OBJECT NAME 7 |
| IMAGE ID 8 | IMAGE DATA 8 | IMAGE NAME 8 | SHOOTING ... 8 | SHOOTING ... 8 | OBJECT NAME 8 |
| IMAGE ID 9 | IMAGE DATA 9 | IMAGE NAME 9 | SHOOTING ... 9 | SHOOTING ... 9 | OBJECT NAME 9 |
| ... | ... | ... | ... | ... | ... |

811 TEXT INFORMATION TABLE

| TEXT ID (812) | RELATED TEXT (813) | SHOOTING DATE AND TIME (814) | SHOOTING LOCATION (815) | OBJECT NAME (816) | IMAGE ID (817) |
|---|---|---|---|---|---|
| TEXT ID 1 | RELATED TEXT 1 | SHOOTING ... 1 | SHOOTING ... 1 | OBJECT NAME 1 | IMAGE ID 1 |
| TEXT ID 2 | RELATED TEXT 2 | SHOOTING ... 2 | SHOOTING ... 2 | OBJECT NAME 2 | IMAGE ID 2 |
| TEXT ID 3 | RELATED TEXT 3 | SHOOTING ... 3 | SHOOTING ... 3 | OBJECT NAME 3 | IMAGE ID 3 |
| TEXT ID 4 | RELATED TEXT 4 | SHOOTING ... 4 | SHOOTING ... 4 | OBJECT NAME 4 | IMAGE ID 4 |
| TEXT ID 5 | RELATED TEXT 5 | SHOOTING ... 5 | SHOOTING ... 5 | OBJECT NAME 5 | IMAGE ID 5 |
| TEXT ID 6 | RELATED TEXT 6 | SHOOTING ... 6 | SHOOTING ... 6 | OBJECT NAME 6 | IMAGE ID 6 |
| TEXT ID 7 | RELATED TEXT 7 | SHOOTING ... 7 | SHOOTING ... 7 | OBJECT NAME 7 | IMAGE ID 7 |
| TEXT ID 8 | RELATED TEXT 8 | SHOOTING ... 8 | SHOOTING ... 8 | OBJECT NAME 8 | IMAGE ID 8 |
| TEXT ID 9 | RELATED TEXT 9 | SHOOTING ... 9 | SHOOTING ... 9 | OBJECT NAME 9 | IMAGE ID 9 |
| ... | ... | ... | ... | ... | ... |

821 COMPARISON ITEM SETTEING TABLE

| CHECK ITEMS (822) | USE SETTING (823) |
|---|---|
| SHOOTING DATE AND TIME | USE |
| SHOOTING LOCATION | USE |
| OBJECT NAME | NOT USE |

FIG. 15

1201 IMAGE INFORMATION TABLE

| IMAGE ID | IMAGE DATA | CHECKED TARGET | IMAGE NAME | SHOOTING DATE AND TIME | SHOOTING LOCATION | OBJECT NAME |
|---|---|---|---|---|---|---|
| IMAGE ID 1 | IMAGE DATA 1 | TARGET | IMAGE NAME 1 | SHOOTING ... 1 | SHOOTING ... 1 | OBJECT NAME 1 |
| IMAGE ID 2 | IMAGE DATA 2 | TARGET | IMAGE NAME 2 | SHOOTING ... 2 | SHOOTING ... 2 | OBJECT NAME 2 |
| IMAGE ID 3 | IMAGE DATA 3 | NONTARGET | IMAGE NAME 3 | SHOOTING ... 3 | SHOOTING ... 3 | OBJECT NAME 3 |
| IMAGE ID 4 | IMAGE DATA 4 | TARGET | IMAGE NAME 4 | SHOOTING ... 4 | SHOOTING ... 4 | OBJECT NAME 4 |
| IMAGE ID 5 | IMAGE DATA 5 | TARGET | IMAGE NAME 5 | SHOOTING ... 5 | SHOOTING ... 5 | OBJECT NAME 5 |
| IMAGE ID 6 | IMAGE DATA 6 | TARGET | IMAGE NAME 6 | SHOOTING ... 6 | SHOOTING ... 6 | OBJECT NAME 6 |
| IMAGE ID 7 | IMAGE DATA 7 | TARGET | IMAGE NAME 7 | SHOOTING ... 7 | SHOOTING ... 7 | OBJECT NAME 7 |
| IMAGE ID 8 | IMAGE DATA 8 | TARGET | IMAGE NAME 8 | SHOOTING ... 8 | SHOOTING ... 8 | OBJECT NAME 8 |
| IMAGE ID 9 | IMAGE DATA 9 | TARGET | IMAGE NAME 9 | SHOOTING ... 9 | SHOOTING ... 9 | OBJECT NAME 9 |
| ... | ... | ... | ... | ... | ... | ... |

1211 TEXT INFORMATION TABLE

| RELATED TEXT | SHOOTING DATE AND TIME | SHOOTING LOCATION | OBJECT NAME |
|---|---|---|---|
| RELATED TEXT 1 | SHOOTING ... 1 | SHOOTING ... 1 | OBJECT NAME 1 |

INFORMATION-PROCESSING APPARATUS, CONTROL METHOD, AND NON-TRANSITORY COMPUTER READABLE MEDIUM

BACKGROUND OF THE INVENTION

Field of the Invention

The present invention relates to technology for preventing the erroneous input of text when adding the text to images.

Description of the Related Art

In recent years, services in which images and text relating the images are managed in association with each other have become widespread. Users input text relating to images and register the images and the text in association with each other. In this case, when the users attempt to add text to all images, time to contemplate the contents of the text and burdens on the users to write the text increase.

On the other hand, there is technology for automatically generating text to be added to images using meta information on the images and adding the text to the images. For example, Japanese Patent Application Laid-open No. 2006-350550 discloses technology for generating comments on captured image data based on attribute information on objects. Thus, burdens on users to input text relating to images are supposed to be reduced.

SUMMARY OF THE INVENTION

However, there is a likelihood that users erroneously change the contents of generated text afterwards. For example, the users are likely to mistake the names or the like of objects when editing text relating to images and change the text into text not matched with information on the images. At that time, the users may not find a mismatch between the images and the text.

In view of the above circumstances, the present invention has an object of providing technology for easily determining the matching of text relating to images.

The present invention in its first aspect provides an information-processing apparatus comprising:

an image acquisition unit configured to acquire information on a predetermined item as image information from an image file;

a comparison unit configured to compare the image information with text data relating to the image file; and a notification unit configured to perform a notification in a case where a result of the comparison indicates a mismatch between the image information and the text data.

The present invention in its second aspect provides a control method for an information-processing apparatus, comprising:

acquiring information on a predetermined item as image information from an image file;

comparing the image information with text data relating to the image file; and performing a notification in a case where a result of the comparison indicates a mismatch between the image information and the text data.

The present invention in its third aspect provides a non-transitory computer readable medium that stores a program, wherein the program causes a computer to execute:

acquiring information on a predetermined item as image information from an image file;

comparing the image information with text data relating to the image file; and performing a notification in a case where a result of the comparison indicates a mismatch between the image information and the text data.

According to an embodiment of the present invention, it is possible to easily determine the matching of text relating to images.

Further features of the present invention will become apparent from the following description of exemplary embodiments with reference to the attached drawings.

BRIEF DESCRIPTION OF THE DRAWINGS

FIG. 5 is a diagram showing an example of the data structure of an image and text information table;

FIGS. 9A and 9B are diagrams showing a second display example of registration images and related text;

FIG. 11 shows diagrams of first structural examples of the tables of image information, text information, and comparison items;

FIG. 15 shows diagrams of second structural examples of the tables of image information and text information.

DESCRIPTION OF THE EMBODIMENTS

Hereinafter, preferred embodiments of the present invention will be described in detail with reference to the drawings. In respective figures, the same configurations will be denoted by the same reference symbols as a rule, and their duplicated descriptions will be omitted. Further, numerical values or the like illustrated by examples for embodying descriptions will not be limited unless otherwise particularly referred to.

Further, the present invention will not be limited to the following embodiments but may be appropriately modified without departing from its spirit. For example, the present invention may be appropriately corrected or modified depending on the configurations or various conditions of an apparatus to which the present invention is applied.

First Embodiment

Software Configuration of Information-Processing Apparatus 100

Figure 1:
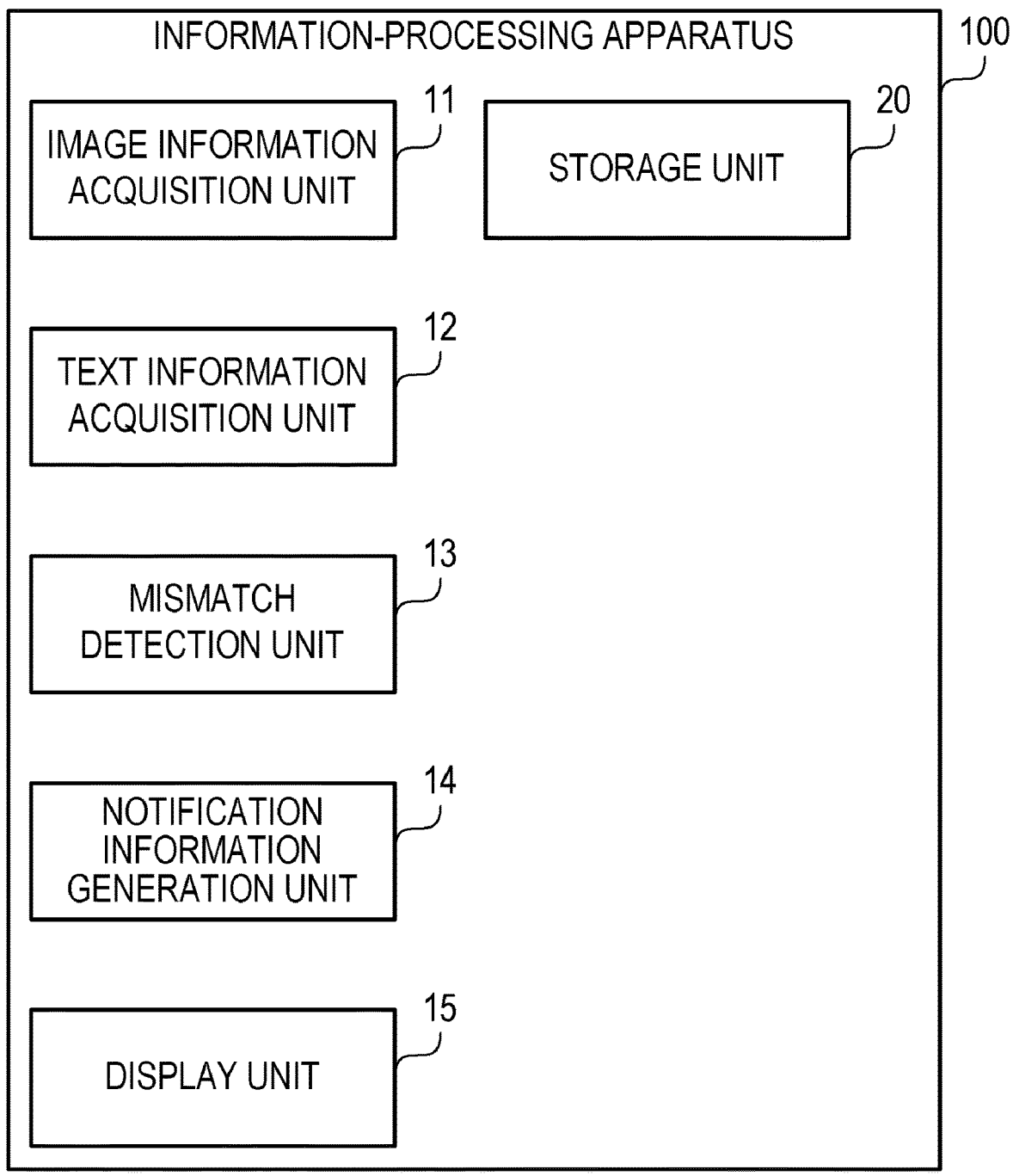
FIG. 1 is a block diagram of the software configuration of an information-processing apparatus according to a first embodiment.

FIG. 1 is a block diagram showing the software configuration of an information-processing apparatus 100 according to a first embodiment. The information-processing apparatus 100 operates a CPU 101 according to an OS or a computer program and controls the respective devices of the information-processing apparatus 100 that will be described later to realize an image information acquisition unit 11, a text information acquisition unit 12, a mismatch detection unit 13, a notification information generation unit 14, and a storage unit 20.

The storage unit 20 is a storage region that stores registration images registered by users and related text relating to the registration images. The related text is text relating to the registration images and input by the users. Further, the related text may be automatically input by the information-processing apparatus 100 based on the registration images.

The image information acquisition unit 11 has the function of acquiring image information from the registration images recorded on the storage unit 20. The image information is information relating to the predetermined items of the registration images and expressed by character string data. For example, the predetermined items are image attributes such as the object names, the shooting dates and times, and the shooting locations of the registration images.

For example, the image information acquisition unit 11 performs an image analysis on the registration images according to a predetermined object recognition method to acquire analysis information such as object names. The object names are names by which objects included in the registered registration images are uniquely identified, or are the names of the types of the objects. Further, the image information acquisition unit 11 may acquire information such as shooting locations and shooting dates and times from meta information associated with the registration images. For example, the meta information may be positional information on shooting locations acquired by a Global Positioning System (GPS). Further, the meta information may be information such as shooting dates and times acquired by a clock provided inside an apparatus that shoots images. Note that the image information acquisition unit 11 is an example of an image acquisition unit.

The text information acquisition unit 12 has the function of acquiring text information from related text recorded on the storage unit 20. The text information is information on predetermined items automatically acquired from the related text. For example, the text information acquisition unit 12 acquires information on respective items such as object names, shooting locations, and shooting dates and times from the related text according to a predetermined text analysis method. Note that the text information acquisition unit 12 is an example of a text acquisition unit.

Further, the predetermined items acquired from the image information and the text information are in common. The predetermined items acquired from the registration images are called image information, and the predetermined items acquired from the related text are called text information. The predetermined items include, for example, object names, shooting locations, shooting dates and times, or the like.

The mismatch detection unit 13 has the function of comparing the image information on the registration images with the text information on the related text relating to the registration images and detecting a mismatch based on a result of the comparison. For example, the mismatch detection unit 13 compares shooting dates and times acquired by the image information acquisition unit 11 with shooting dates and times acquired by the text information acquisition unit 12. Then, when a result of the comparison indicates that the shooting dates and times are different from each other, the mismatch detection unit 13 detects the shooting dates and times as mismatch items. Note that the mismatch detection unit 13 is an example of a comparison unit.

The notification information generation unit 14 has the function of generating notification information on a mismatch when the mismatch between the image information and the text information is detected.

For example, the notification information generation unit 14 generates comments on a mismatch between the image information and the text information. Note that the notification information generation unit 14 is an example of a notification generation unit.

The display unit 15 has the function of displaying the registration images, the related text, and the comments. For example, the display unit 15 displays the comments generated by the notification information generation unit 14 at positions adjacent to the related text in which a mismatch has been detected.

Figure 2:
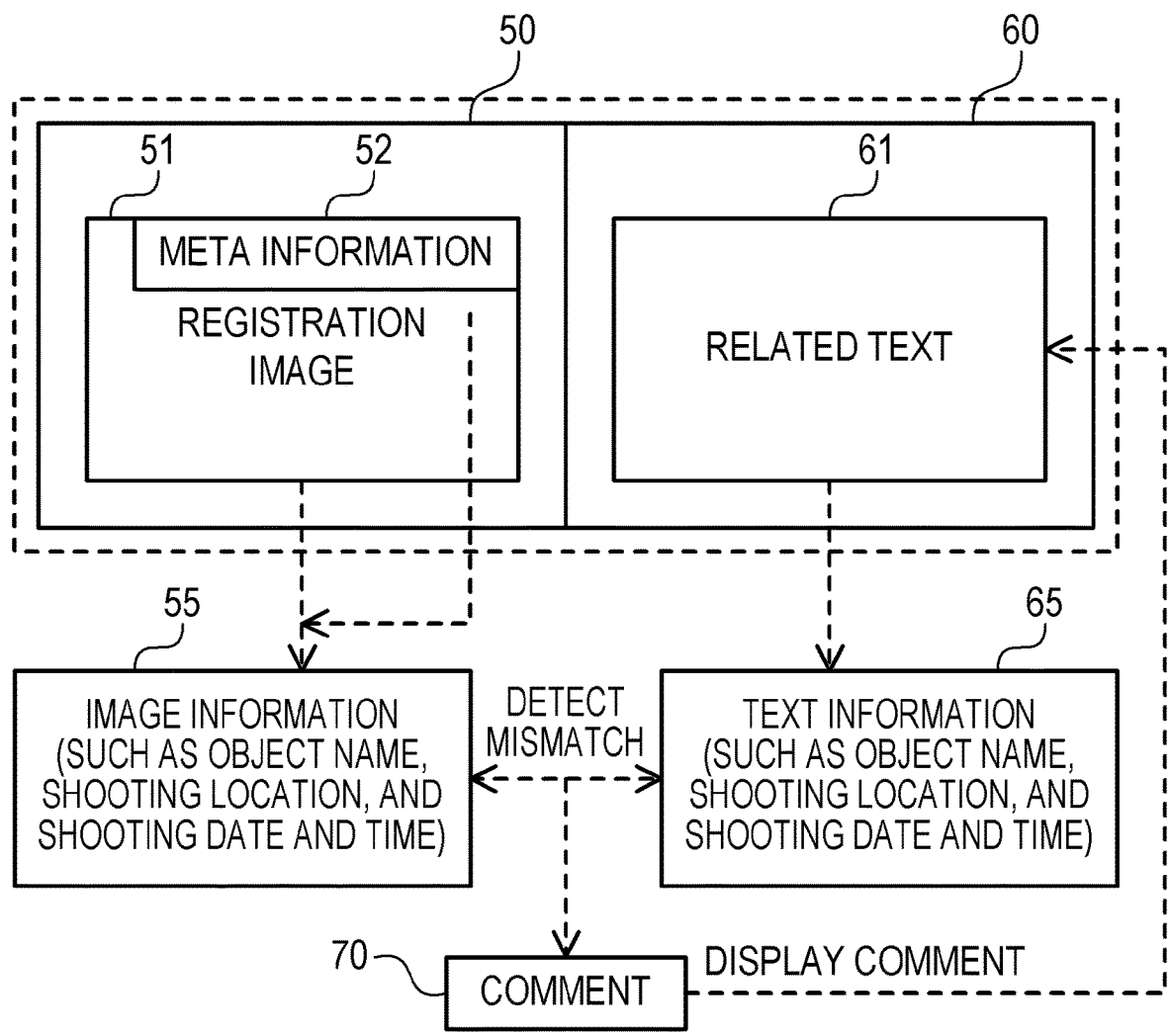
FIG. 2 is a diagram for describing an example of processing by the information-processing apparatus.

FIG. 2 is a diagram for describing an example of processing by the information-processing apparatus 100. A screen includes a region 50 for displaying a registration image and a region 60 for inputting related text relating to the registration image. The display unit 15 causes a registration image 51 to be displayed in the region 50 and related text 61 to be displayed in the region 60. The registration image 51 includes meta information 52 such as a shooting date and time and a shooting location.

The image information acquisition unit 11 acquires image information 55 from the registration image 51 and the meta information 52. For example, the image information acquisition unit 11 performs an image analysis on the registration image 51 according to a predetermined object recognition method to acquire an object name from the registration image 51. Further, the image information acquisition unit 11 acquires a shooting location and a shooting date and time from the meta information 52.

The text information acquisition unit 12 acquires text information 65 from the related text 61 according to a predetermined text analysis method. The text information 65 includes, for example, an object name, a shooting location, and a shooting date and time.

The mismatch detection unit 13 compares image information on a registration image with text information on related text relating to the registration image and detects a mismatch between the image information and the text information according to a result of the comparison. For example, when a shooting date and time of the image information 55 and a shooting date and time of the text information 65 do not match each other, the mismatch detection unit 13 detects the shooting dates and times as mismatch information.

The notification information generation unit 14 generates a comment 70 using the shooting dates and times detected as the mismatch information. The comment 70 is, for example, "Should be xx (month) yy (day)?" The information-processing apparatus 100 causes the comment 70 to be displayed at a position adjacent to the related text 61.

Hardware Configuration of Information-processing Apparatus

Figure 3:
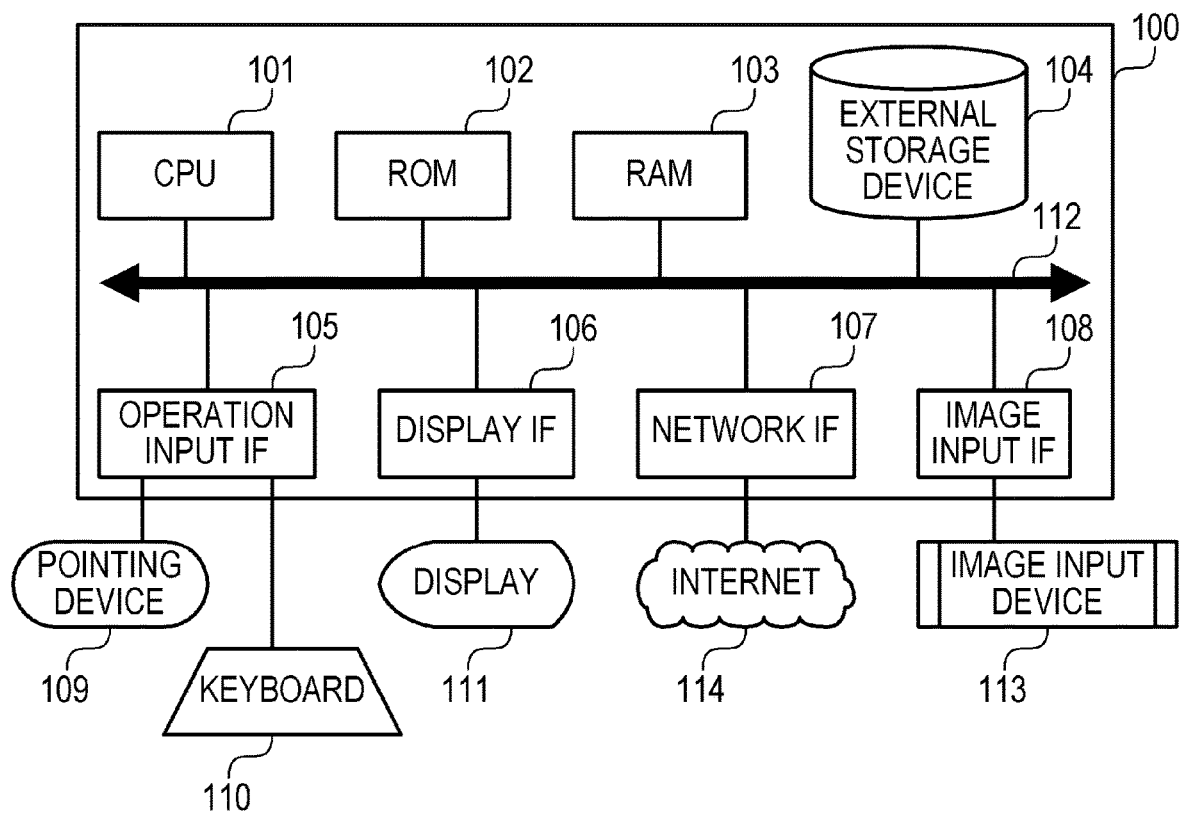
FIG. 3 is a diagram showing an example of the hardware configuration of the information-processing apparatus.

FIG. 3 is a diagram showing an example of the hardware configuration of the information-processing apparatus 100. In FIG. 3, a central processing unit (CPU) 101 is a control unit that controls the whole information-processing apparatus 100. A read-only memory (ROM) 102 is a memory that stores a program or a parameter not required to be changed. A random-access memory (RAM) 103 is a memory that temporarily stores a program or data supplied from an external storage device 104, the Internet 114, or the like. The external storage device 104 is a storage device including a hard disk or a memory card fixedly provided in the information-processing apparatus 100, and an optical disk, a magnetic or optical card, an IC card, or the like attachable/detachable to/from the information-processing apparatus 100.

An operation input interface (IF) 105 is an interface with an input device such as a pointing device 109 and a keyboard 110 that receives an operation by an editor to input various data. A display IF 106 is an interface with a display device such as a display 111 for displaying data held by the information-processing apparatus 100 or supplied data. A network IF 107 is a network interface for connection to a network line such as the Internet 114. An image input IF 108 is an interface with an image input device 113.

A bus 112 is a system bus that communicably connects the respective devices 101 to 108 to each other. Note that the following processing is realized when the CPU 101 of the information-processing apparatus 100 reads and activates a program supplied from the external storage device 104, the Internet 114, or the like and controls the various devices according to the program.

An information processing method may be realized by a single computer or a plurality of computers to which respective functions are allocated as occasion demands. In a case in which a plurality of computers is used, the computers are connected via a local area network (LAN) or the like so as to communicate with each other.

Example of User Interface

Figure 4A:
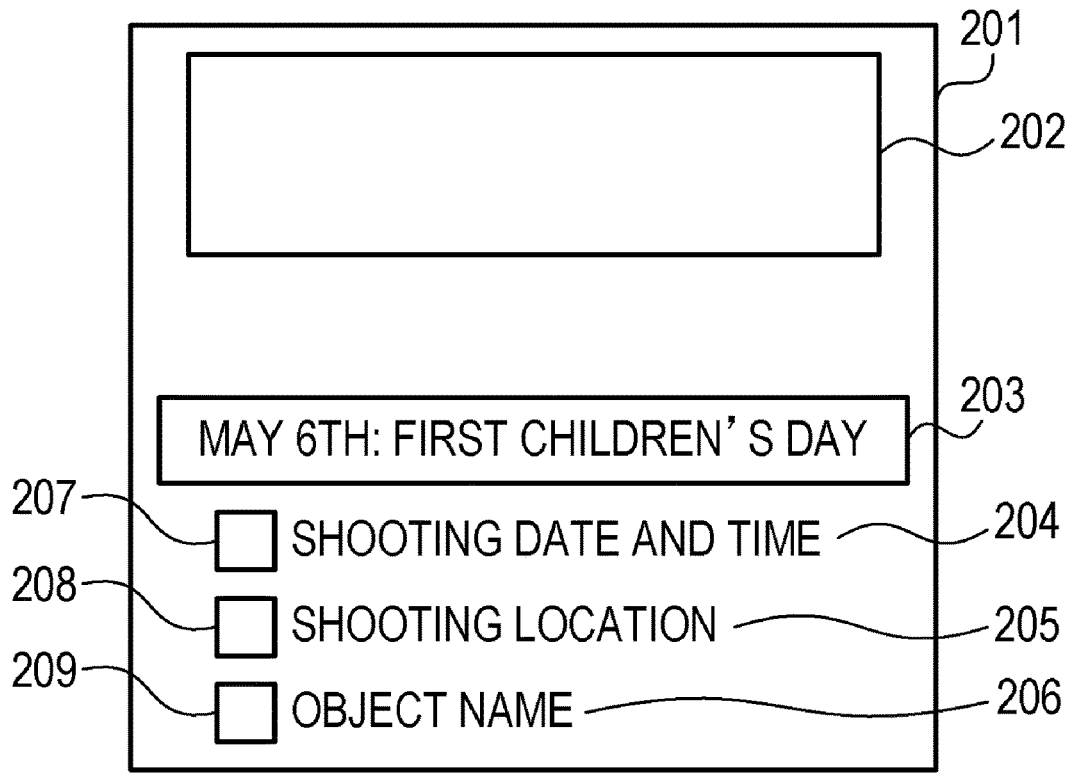
FIGS. 4A and 4B are diagrams showing a first display example of a registration image and related text.
Figure 4B:
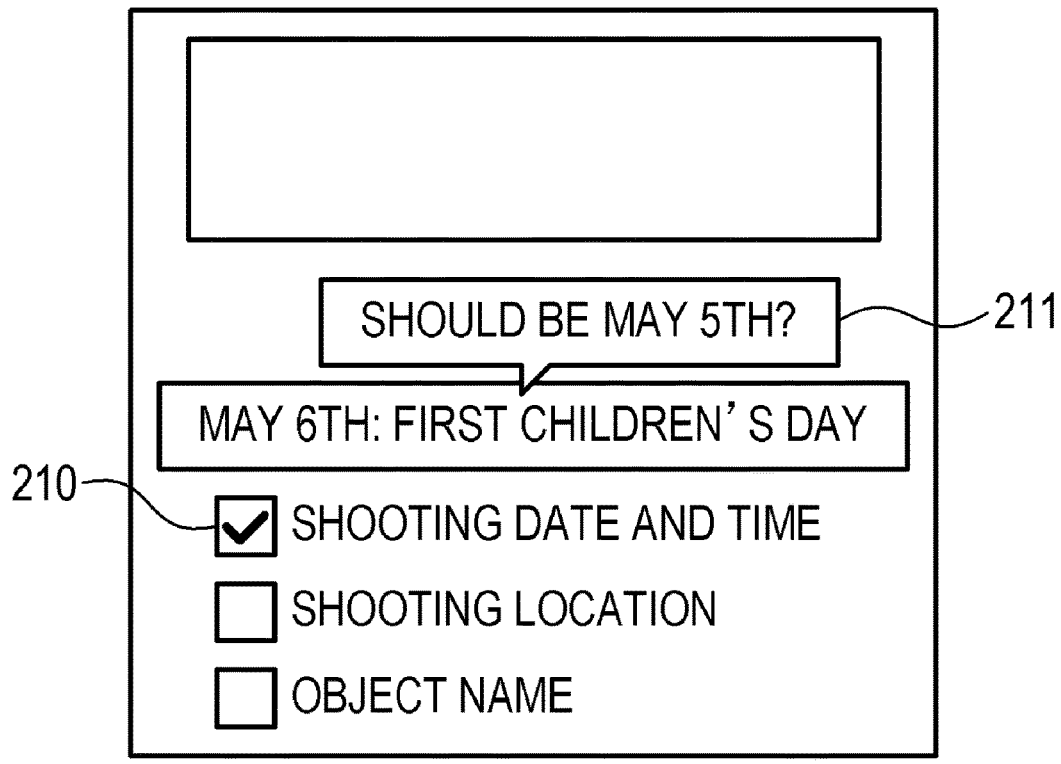

FIGS. 4A and 4B are diagrams showing a first display example of a registration image and related text.

In FIG. 4A, a screen 201 is an example of a screen displayed according to the processing by the information-processing apparatus 100. On the screen 201, a registration image 202 and related text 203 are displayed. Further, items 204, 205, and 206 are displayed on the screen 201 as the contents of the comparison items of the registration image and the related text.

Further, check boxes 207, 208, and 209 correspond to the items 204, 205, and 206, respectively. The display unit 15 changes the display statuses of the check boxes when detecting a click on the check boxes. Specifically, when detecting a click on the check box 207, the display unit 15 changes the unchecked display status of the check box 207 to the checked display status of the check box 210 to change the screen 201.

FIG. 4B shows a display example in a case in which the check box is checked.

Data Structure of Table

FIG. 5 is a diagram showing an example of the data structure of an image and text information table. An image and text information table 301 is recorded on the storage unit 20 and associates image ID 302, image data 303, and related text 304 with each other.

The image IDs 302 are identifiers for uniquely identifying image data. The image data 303 is the data of registration images registered by a user. For example, the image data 303 is expressed by image files such as GIF, JPEG, and PNG. The related text 304 is the data of related text registered by the user.

For example, the information-processing apparatus 100 displays the registration image 202 with image data acquired from the image and text information table 301. Further, the information-processing apparatus 100 displays the related text 304 corresponding to the image data in the image and text information table 301 as the related text 203.

Note that the image data and the related text data recorded on the image and text information table 301 may be the address information of the storage unit 20 on which registration images or related text is recorded. The same applies to other tables that will be described later.

Flow of Processing

Figure 6:
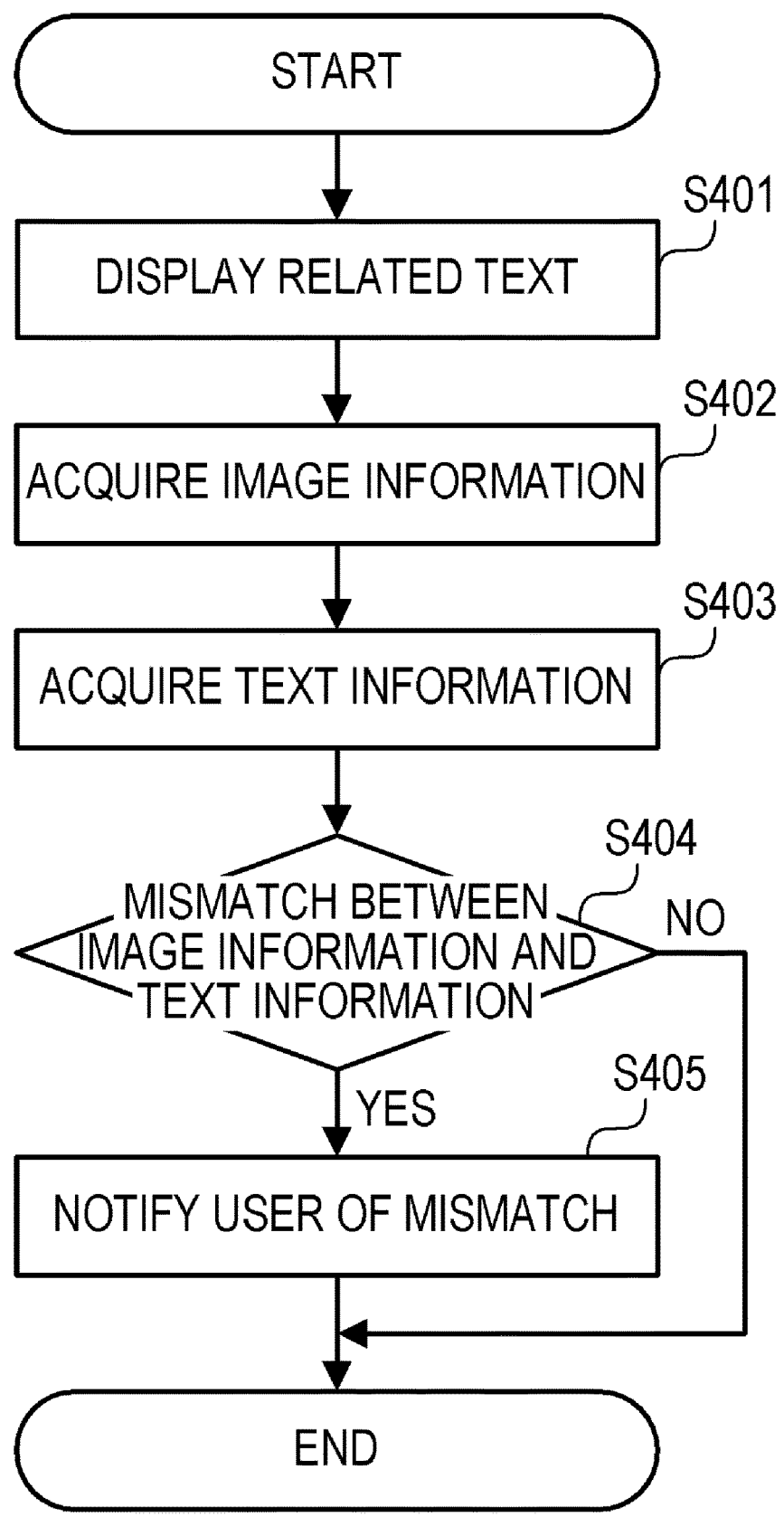
FIG. 6 is a diagram showing an example of the flow of the processing by the information-processing apparatus according to the first embodiment.

FIG. 6 is a diagram showing an example of the flow of the processing by the information-processing apparatus 100 according to the first embodiment. The display unit 15 displays the registration image 202 and the related text 203 relating to the registration image 202 on the screen 201 (step S401). For example, in FIG. 4A, the display unit 15 displays the registration image 202 acquired from the storage unit 20 or the like on the screen 201. Further, the display unit 15 displays the related text 203 corresponding to the registration image 202 on the screen 201.

The image information acquisition unit 11 acquires image information from the registration image (step S402). For example, in FIG. 4B, the image information acquisition unit 11 acquires information on a shooting date and time of the item 204 corresponding to a check box 210 put into a checked status from the registration image 202. Further, the text information acquisition unit 12 acquires information on a shooting date and time from the related text 203.

Note that a shooting date and time, a shooting location, and an object name shown in FIGS. 4A and 4B are examples of items acquired from meta information or according to an image analysis. The items acquired from the meta information are not limited to such items but may be information acquired from the registration image such as a shooting mode, a lens type, and an object status.

Further, the text information acquisition unit 12 acquires text information from the related text. For example, in FIG. 4B, the text information acquisition unit 12 acquires information on a shooting date and time of the item 204 corresponding to the check box 210 put into a checked status from the related text (step S403).

The mismatch detection unit 13 compares the acquired image information (shooting date and time) with the acquired text information (shooting date and time) and determines whether a mismatch between the items (shooting dates and times) occurs based on a result of the comparison (step S404). When the result of the comparison indicates that the shooting dates and times are different from each other and the mismatch between the items occurs (YES in step S404), the notification information generation unit 14 generates a comment 211 on the mismatch and causes the display unit 15 to display the comment 211 on the screen 201 (step S405). When the result of the comparison indicates that the shooting dates and times are not different from each other and the mismatch between the items does not occur (NO in step S404), the notification information generation unit 14 ends the processing without generating the comment.

In the example of FIG. 4B, since "May 5th" is acquired as the image information while "May 6th" is acquired from the related text, it is determined that the image information and the text information do not match each other. Therefore, "Should be May 5th?" is displayed as the comment 211.

As described above, when text information acquired from related text is different from image information acquired from a registration image, information on a mismatch between the text information and the image information is displayed as a comment, whereby a user is allowed to find the mismatch between the registration image and the related text. Note that the comment is balloon-displayed in the present embodiment but may be displayed in such a manner as to change the color of the mismatched part of the related text, draw an underline, or put an alert mark.

Second Embodiment

Hereinafter, a second embodiment will be described. The above first embodiment describes an example of processing in which the mismatch of one registration image with respect to related text is detected. On the other hand, the second embodiment will describe an example of processing in which a plurality of registration images and related text added to each of the registration images are compared with each other at the same time to notify a user of a mismatch.

Further, an example of processing in which related text is corrected will be described. Note that the hardware configuration of an information-processing apparatus 150 according to the present embodiment is the same as that shown in FIG. 3 according to the first embodiment.

Software Configuration of Information-Processing Apparatus 150

Figure 7:
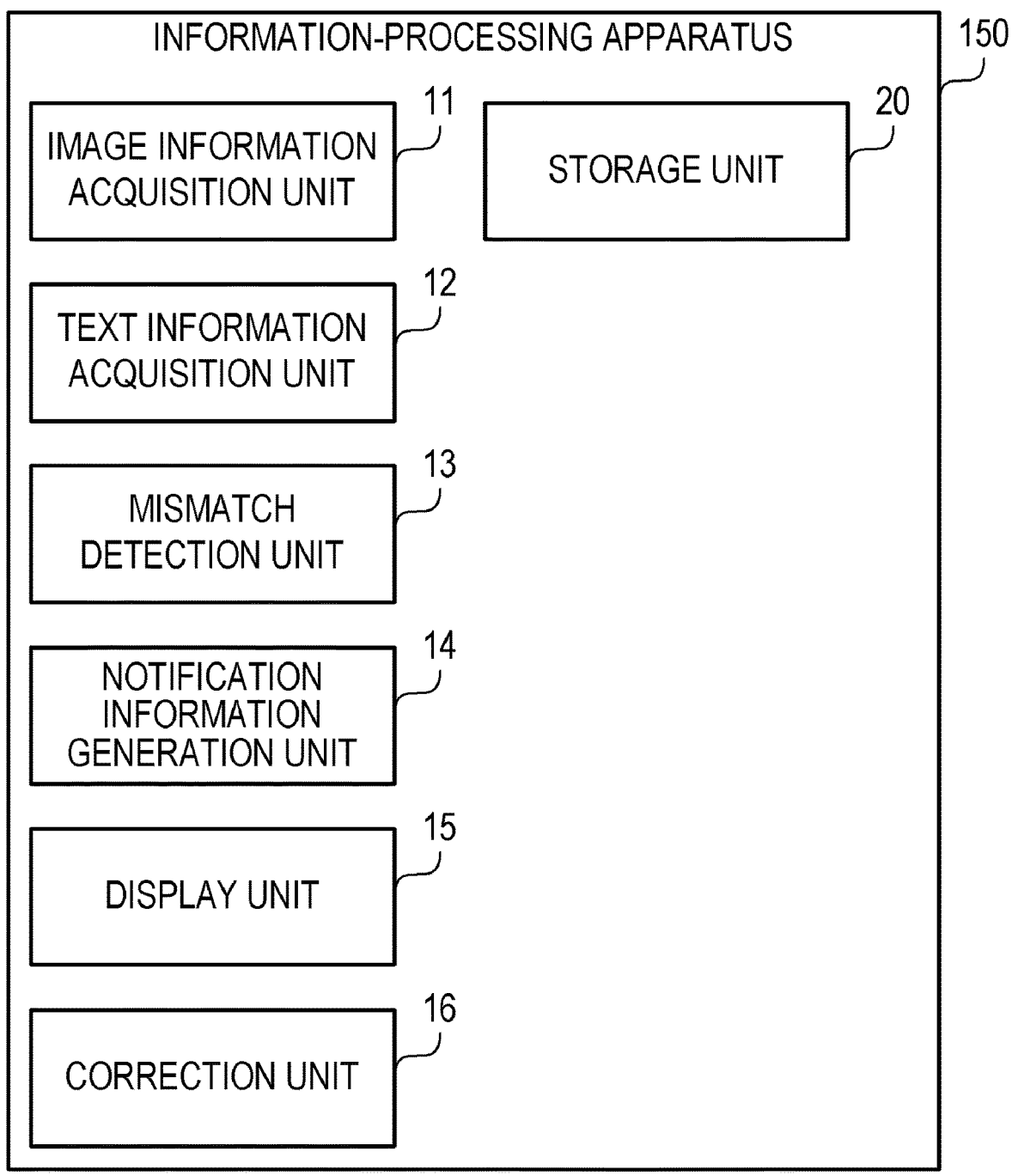
FIG. 7 is a block diagram showing the software configuration of an information-processing apparatus according to a second embodiment.

FIG. 7 is a block diagram showing the software configuration of the information-processing apparatus 150 according to the second embodiment. The information-processing apparatus 150 according to the second embodiment is different from the information-processing apparatus 100 according to the first embodiment in that the information-processing apparatus 150 has a correction unit 16.

The correction unit 16 has the function of correcting a part of related text corresponding to a mismatch detected by a mismatch detection unit 13 based on image information according to an instruction from a user. For example, when a comment on a mismatch between a registration image and related text is displayed, the correction unit 16 performs a correction to reflect the content of the comment on the related text as the comment is pressed by the user.

Example of User Interface

The operation of the information-processing apparatus 150 during the registration of images according to the second embodiment will be described with reference to FIGS. 8A and 8B, FIGS. 9A and 9B, and FIGS. 10A and 10B.

Figure 8A:
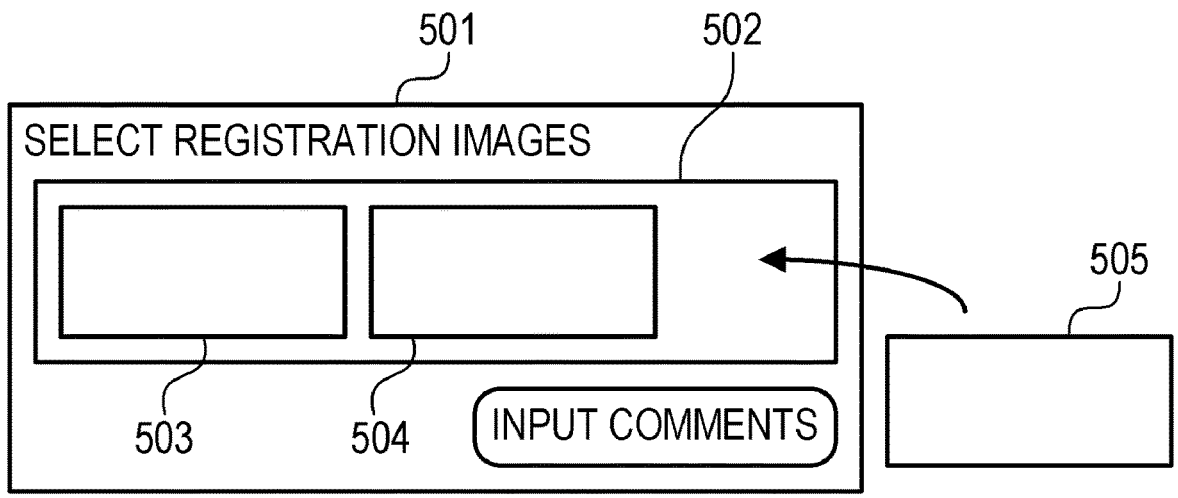
FIGS. 8A and 8B show an example of a registration screen for registering images.
Figure 8B:
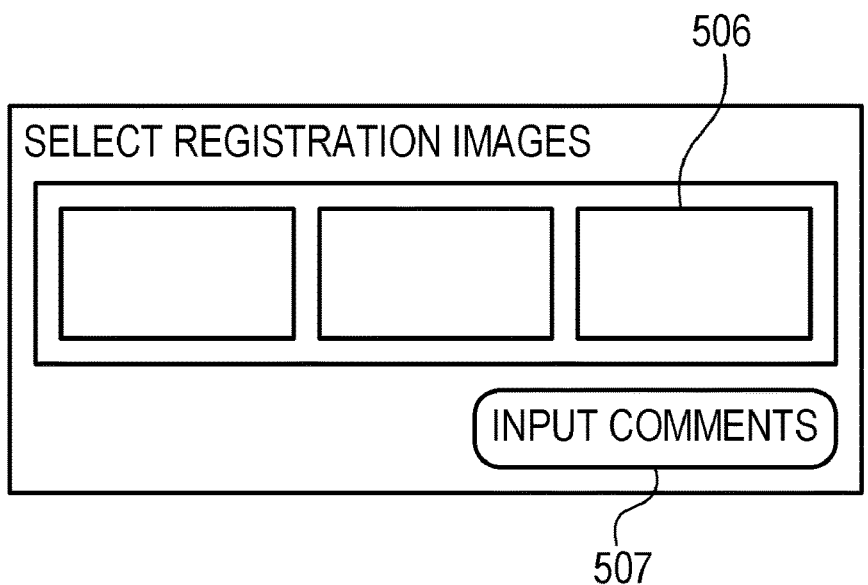

FIGS. 8A and 8B show an example of a registration screen for registering images. In FIG. 8A, the information-processing apparatus 150 causes a region 502 for displaying registration images to be displayed on a screen 501. In the region 502, registration images 503 and 504 preset as registration images are displayed. Moreover, in FIG. 8B, when detecting the movement of an image 505 into the region 502, the information-processing apparatus 150 recognizes the image 505 as a registration image and causes the image 505 to be displayed in the region 502 as a registration image 506.

When a button 507 shown in FIG. 8B is pressed by a user, an image information acquisition unit 11 acquires shooting dates and times, shooting locations, or the like as image information from meta information on the registration images 503, 504, and 506 in the region 502. Further, the image information acquisition unit 11 acquires object names or the like as image information from analysis information on the registration images.

Next, the information-processing apparatus 150 stores the registration images 503, 504, and 506 in the region 502 in an image information table 801 (see FIG. 11) of a storage unit 20. The image information table 801 is a table in which registration images and image information are associated with each other. The data structure of the image information table will be described later.

Figure 9B:
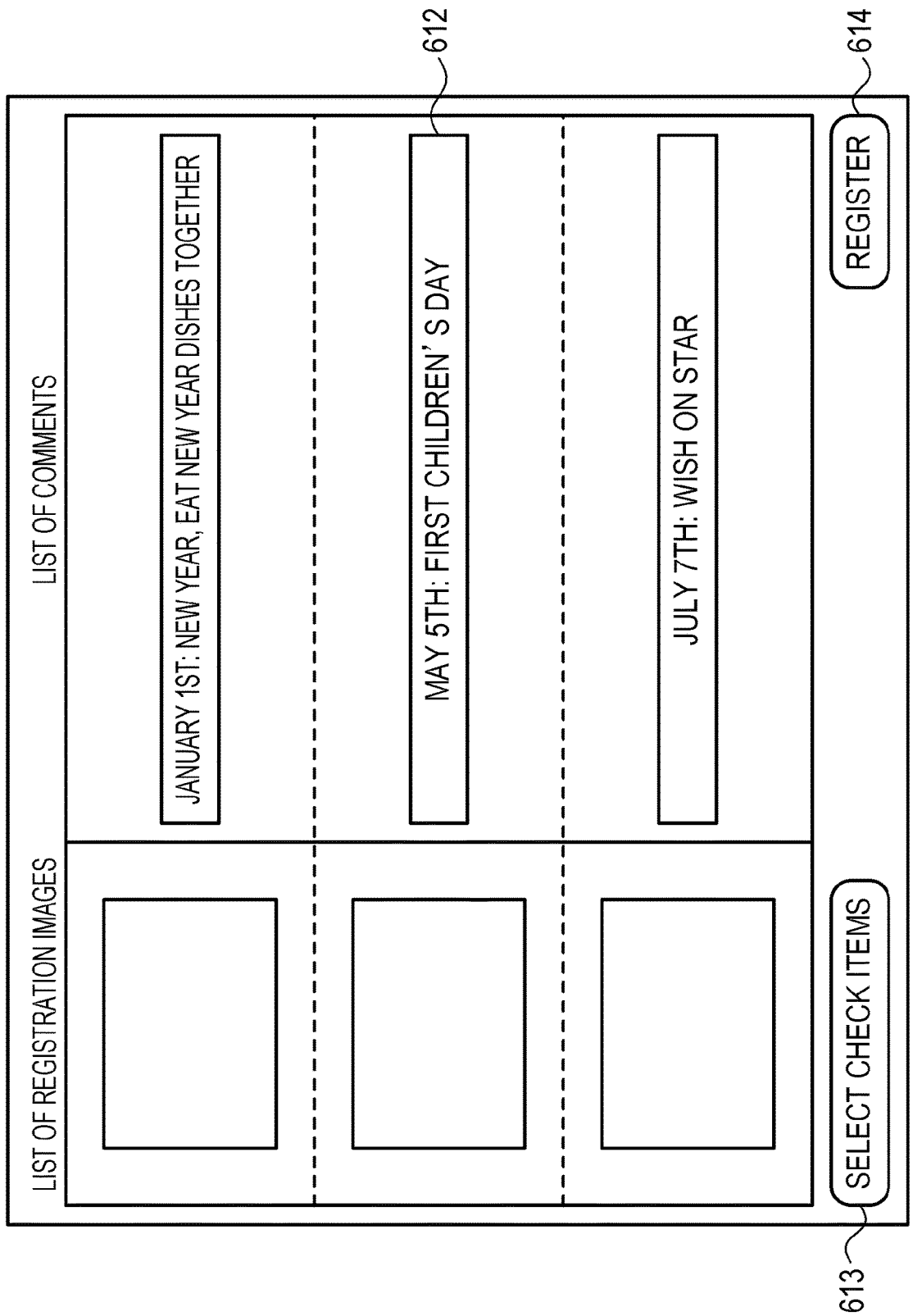

FIGS. 9A and 9B are diagrams showing a second display example of registration images and related text. When the button 507 shown in FIG. 8B is pressed by the user, the information-processing apparatus 150 causes a screen 601 shown in FIG. 9A for displaying a plurality of registration images and related text corresponding to the registration images to be displayed.

A region 602 is a display region for displaying registration images. Further, a region 603 is a text input region for receiving the inputs of related text corresponding to the registration images.

The configuration of the screen shown in FIG. 9A will be described. The screen 601 is a screen for displaying respective registration images and receiving the inputs of the related text corresponding to the respective registration images.

In the region 602, registration images 604, 605, and 606 are displayed. Note that the registration images 604, 605, and 606 correspond to the registration images 503, 504, and 506 shown in FIGS. 8A and 8B, respectively.

Further, text input regions 607, 608, and 609 are displayed in the region 603. The text input region 607 is a region for inputting related text corresponding to the registration image 604. Further, the text input region 608 is a region for inputting related text corresponding to the registration image 605. The text input region 609 is a region for inputting related text corresponding to the registration image 606.

The information-processing apparatus 150 receives related text input via a keyboard or related text registered in an external storage device 104 or the like in the text input region 607. Next, the text information acquisition unit 12 analyzes the related text to acquire text information. Then, the text information acquisition unit 12 stores the related text and the text information acquired from the related text in a text information table 811 (see FIG. 11) of the storage unit 20. The text information table 811 is a table in which the related text and the text information are associated with each other. Note that the data structure of the text information table 811 will be described later.

When a mismatch between the text information and the image information is detected by a mismatch detection unit 13, a notification information generation unit 14 displays a comment 610 in the text input region in which the mismatch has been detected.

Further, when a click on the comment 610 by the user is detected, the correction unit 16 corrects the content of the related text in the text input region according to the content of the comment.

Figure 10A:
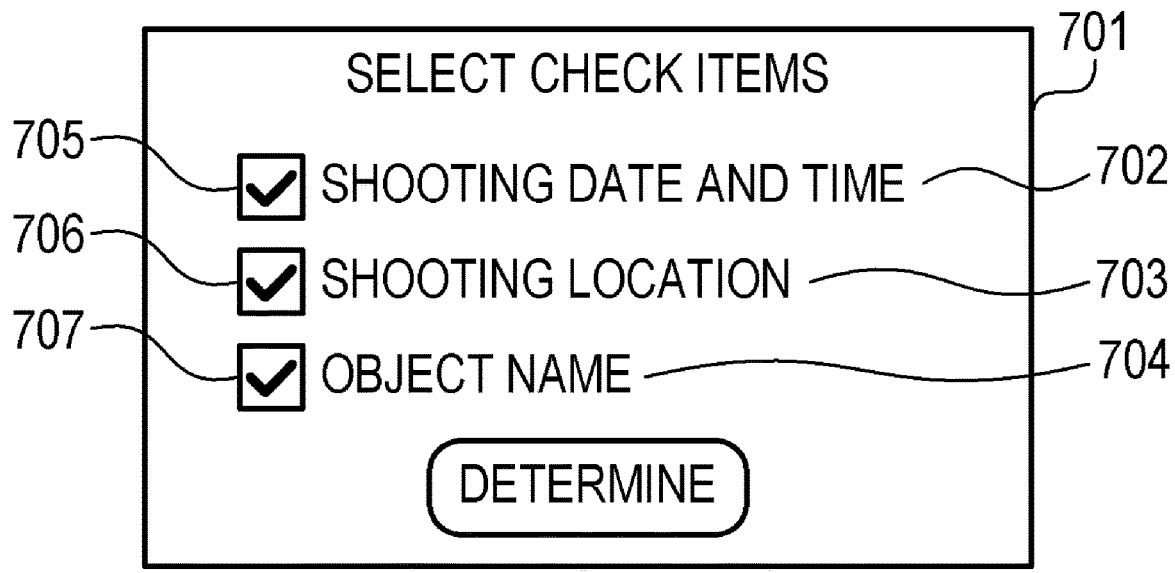
FIGS. 10A and 10B are diagrams showing an example of a selection screen for selecting check items.
Figure 10B:
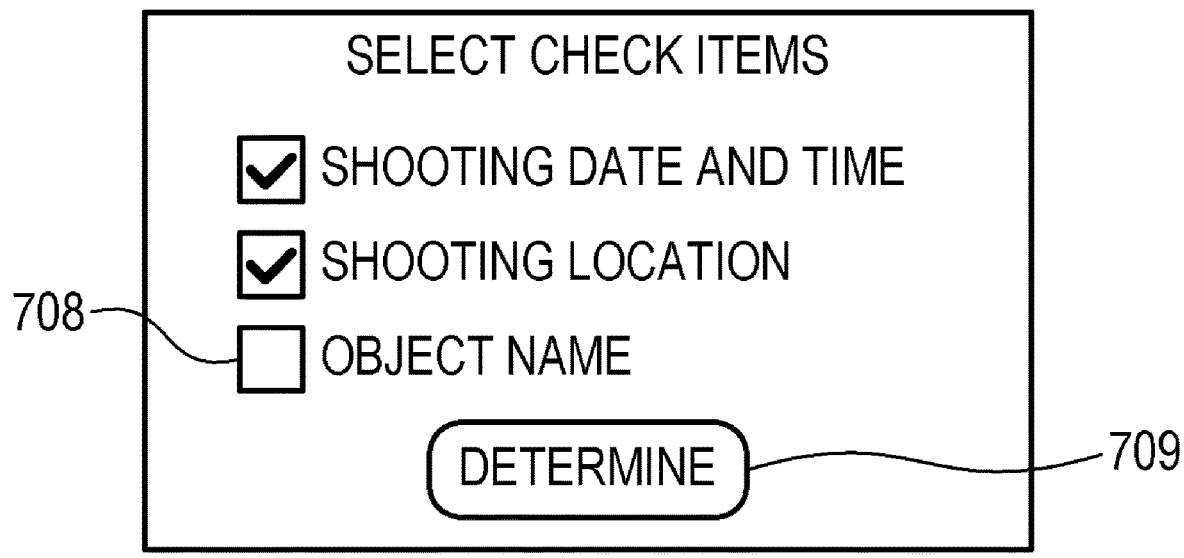

FIGS. 10A and 10B are diagrams showing an example of a selection screen for selecting check items.

The selection of check items will be described with reference to FIGS. 10A and 10B. When detecting the press of a button 613 shown in FIG. 9B by the user, the information-processing apparatus 150 causes information on comparison items stored in a comparison item setting table 821 (see FIG. 11) to be displayed on a screen 701. For example, the information-processing apparatus 150 causes items 702, 703, and 704 to be displayed on the screen 701 as the comparison items stored in the comparison item setting table 821. The item 702 is an item relating to a shooting date and time. Further, the item 703 is an item relating to a shooting location. Further, the item 704 is an item relating to an object name.

Check boxes 705, 706, and 707 correspond to the items 702, 703, and 704, respectively. When detecting a click on the check boxes, the information-processing apparatus 150 changes the display statuses of the check boxes.

When a button 709 is pressed by the user, the screen 701 is closed. For the items of the check boxes put into a checked status, the mismatch detection unit 13 compares the items of the text information table 811 with the corresponding items of the image information table 801 for each record. Thus, the notification information generation unit 14 changes the display of a comment 611 according to the checked items.

A button 614 is a button for ending the input and the edit of the related text. When detecting the press of the button 614 by the user, the information-processing apparatus 150 closes the screen 601 to end the edit of the related text.

Data Structures of Tables

FIG. 11 shows diagrams of first structural examples of the tables of image information, text information, and comparison items. The image information table 801 is a table in which registration images and image information are associated with each other. In the image information table 801, image IDs 802, image data 803, image names 804, shooting dates and times 805, shooting locations 806, and object names 807 are associated with each other.

The image IDs 802 are identifiers for uniquely identifying the registration images. The image data 803 indicates the data of the registration images. The image data 803 may be address information on the registration images. The image names 804 are the file names of image files. The shooting dates and times 805 indicate the shooting dates and times of the images. The shooting locations 806 indicate the shooting locations of the images. The object names 807 are the names of objects acquired from the registration images according to an image analysis.

Note that each of the object names 807 does not necessarily store one object name but may store a plurality of object names when a plurality of objects is detected from a registration image according to an image analysis.

The text information table 811 is a table in which related text and text information are associated with each other. In the text information table 811, text IDs 812, related text 813, shooting dates and times 814, shooting locations 815, object names 816, and image IDs 817 are associated with each other.

The text IDs 812 are identifiers for uniquely identifying the related text. The related text 813 is the data of the related text input in a text input region. The related text 813 may be the address information of the related text. The shooting dates and times 814 are shooting dates and times acquired from the related text according to a predetermined text analysis method. The shooting locations 815 are shooting locations acquired from the related text according to a predetermined text analysis method. The object names 816 are information on object names acquired from the related text according to a predetermined text analysis method.

The image IDs 817 are identifiers for uniquely identifying the registration images. The image IDs 817 correspond to the image IDs 802 of the image information table 801. Further, the mismatch detection unit 13 searches for the records of the image information table corresponding to the records of the text information table 811 based on the image IDs 813.

Note that each of the shooting dates and times 814, the shooting locations 815, and the object names 816 do not necessarily store one data but may store a plurality of data when the plurality of data is acquired according to a predetermined text analysis method. Further, when the shooting dates and times 814, the shooting locations 815, and the object names 816 are not acquired, data may not be input.

Further, the shooting dates and times 814, the shooting locations 815, and the object names 816 of the text information table 811 are items that are to be compared with the shooting dates and times 805, the shooting locations 806, and the object names 807 of the image information table 801, respectively.

The comparison item setting table 821 is a table in which the settings of items used for comparison between image information and text information are stored. In the comparison item setting table 821, check items 822 and use settings 823 are associated with each other. The check items 822 are item names used for comparison between the registration images and the related text corresponding to the registration images. The use settings 823 indicate settings as to whether the check items are to be used for the comparison.

For example, when the check box 705 of the item 702 of the shooting date and time shown in FIG. 10A is put into a checked status, "use" is stored in the use settings 823 of the comparison item setting table 821 as to whether the records of the shooting dates and times are to be used. Further, when the check box 707 of the item 704 of the object name shown in FIG. 10A is not put into a checked status, "not use" is stored in the use settings 823 of the comparison item setting table 821 as to whether the records of the object names are to be used. Further, the information-processing apparatus 150 may register "use" in the use settings 823 of the respective records in the comparison item setting table 821 as initial settings.

Note that check items other than the shooting dates and times, the shooting locations, and the object names may be set as the check items 822.

Flow of Processing

Figure 12:
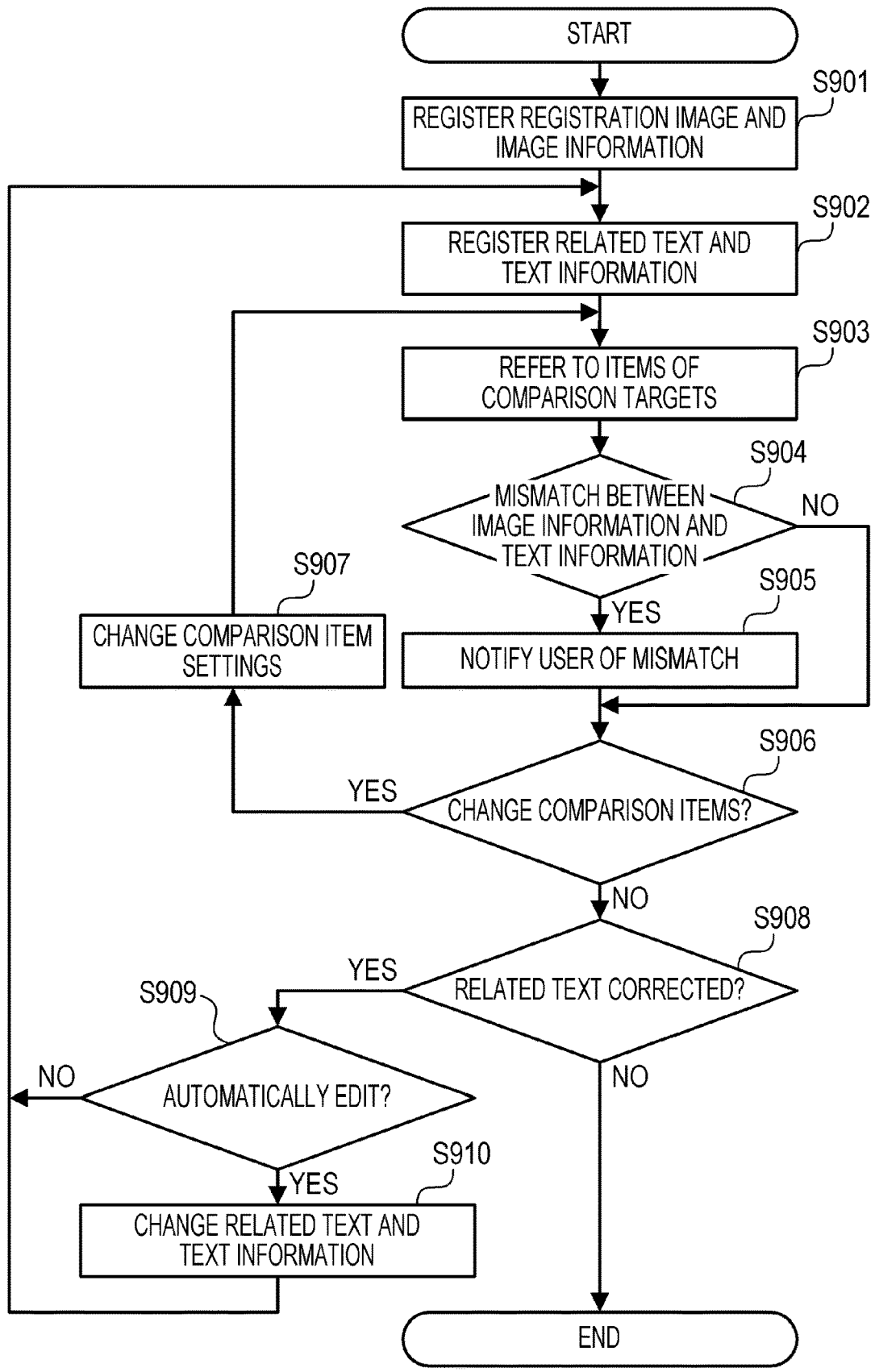
FIG. 12 is a diagram showing an example of the flow of processing by information-processing apparatus according to the second embodiment.

FIG. 12 is a diagram showing an example of the flow of processing by the information-processing apparatus 150 according to the second embodiment. When the button 507 shown in FIG. 8B is pressed by the user, the information-processing apparatus 150 registers registration images in the region 502 of the screen 501 and image information acquired from the registration images in the records of the image information table 801 in association with each other (step S901). The image information includes the items of object names acquired according to an image analysis, shooting dates and times and shooting locations acquired from meta information, or the like.

Next, the information-processing apparatus 150 performs a transition to the screen 601 (FIG. 9A) for registering related text. Further, the items of the respective comparison targets of the image information table 801 are registered as the check items 822 of the comparison item setting table 821.

Then, when the information-processing apparatus 150 receives the inputs of related text in the region 603 of the screen 601 shown in FIG. 9A, the text information acquisition unit 12 acquires the input related text from the region 603. Further, the information-processing apparatus 150 registers text information acquired from the related text according to a predetermined text analysis method in the same records of the text information table 811 in association with each other (step S902). The text information includes, for example, the items of object names, shooting dates and times, and shooting locations acquired according to a text analysis.

Next, the mismatch detection unit 13 refers to the use settings 823 of the comparison item setting table 821 (step S903) to specify the items of comparison targets. Specifically, the mismatch detection unit 13 specifies records for which "use" is set in the use settings 823 of the comparison item setting table 821 as the items of the comparison targets.

Then, the mismatch detection unit 13 compares the corresponding records of the image information table 801 and the text information table 811 with each other with respect to the specified items of the comparison targets to determine whether a mismatch between the image information and the text information occurs (step S904). Note that the mismatch detection unit 13 may specify the corresponding records of the image information table 801 and the text information table 811 based on the image IDs of the text information table 811.

When the mismatch between the image information and the text information occurs (YES in step S904), the notification information generation unit 14 causes data from the image information table 801 for confirming the mismatch to be displayed in the region 603 as a comment to notify the user of the mismatch (step S905). For example, when the shooting date and time of image information on the registration image 605 is "May 5th" while the shooting date and time of text information in the text input region 608 is "May 6th," the notification information generation unit 14 displays "Should be May 5th?" as the comment 610. Further, when a mismatch is detected by the mismatch detection unit 13 since the object name of text information in the text input region 609 is "star" while the object name of the image information of the registration image 606 is "night view," the notification information generation unit 14 displays "Should be night view?" as the comment 611.

On the other hand, when no mismatch is detected (NO in step S904), the notification information generation unit 14 proceeds to the processing of step S906 without notifying the user of a comment.

Next, the information-processing apparatus 150 determines whether there is a need to change the comparison item setting table 821 (step S906). When the button 613 shown in FIG. 9A is pressed by the user (YES in step S906), the information-processing apparatus 150 causes the screen 701 shown in FIG. 10A for changing the comparison item setting table 821 to be displayed.

The information-processing apparatus 150 changes the use settings 823 of the comparison item setting table 821 shown in FIG. 11 according to the presence or absence of a check in the check boxes of the screen 701 (step S907).

For example, the information-processing apparatus 150 sets "use" in the use settings 823 for the records corresponding to the check items put into a checked status shown in FIGS. 10A and 10B. On the other hand, the information-processing apparatus 150 sets "not use" in the use settings 823 for the records corresponding to the check items not put into a checked status.

When the button 709 of the screen 701 is pressed by the user, the information-processing apparatus 100 returns to the processing of step S903.

On the other hand, when the button 613 shown in FIG. 9B is not pressed but the button 614 is pressed by the user in step S906 (NO in step S906), the information-processing apparatus 150 proceeds to the processing of step S908.

Then, the correction unit 16 determines whether the related text has been corrected (step S908). When the related text has not been corrected (NO in step S908), the information-processing apparatus 150 ends the processing.

On the other hand, when the related text has been corrected (YES in step S908), the correction unit 16 determines whether the related text is to be automatically edited (step S909). When detecting a click on the comment 610 (YES in step S909), the correction unit 16 generates correction data corresponding to the comment 610 and changes the related text based on the correction data. In addition, the correction unit 16 changes the text information of the text information table 811 based on the correction data. For example, when detecting the click on the comment 610 in FIG. 9A, the correction unit 16 corrects "May 6th" into "May 5th" according to the comment 610. Further, the correction unit 16 deletes the comment 610 from the region 603 after the correction processing. Then, the information-processing apparatus 150 returns to the processing of step S902 to perform the processing on the corrected related text.

Third Embodiment

The above second embodiment describes an example in which one related text is registered with respect to one registration image and a comment for confirming a mismatch is displayed with respect to the related text in which the mismatch has been detected. A third embodiment will describe an example in which one related text is registered with respect to a plurality of registration images and a comment is displayed with respect to the one related text. Note that the hardware configuration of the present embodiment is the same as that of the first embodiment shown in FIG. 3. Further, the software configuration of the present embodiment is the same as that of the second embodiment shown in FIG. 7. Further, a registration screen for registering registration images in the present embodiment is the same as that in the second embodiment shown in FIGS. 8A and 8B.

When a button 507 shown in FIG. 8B is pressed by a user, an information-processing apparatus 150 acquires image information from registration images 503, 504, and 506 in a region 502. Next, an information-processing apparatus 150 stores the registration images 503, 504, and 506 in the region 502 and the image information corresponding to the respective registration images in an image information table 1201 (see FIG. 15). Then, the display unit 15 performs a transition to a screen 1001 shown in FIG. 13A for generating related text. Note that the data structure of the image information table 1201 will be described later.

Figure 13A:
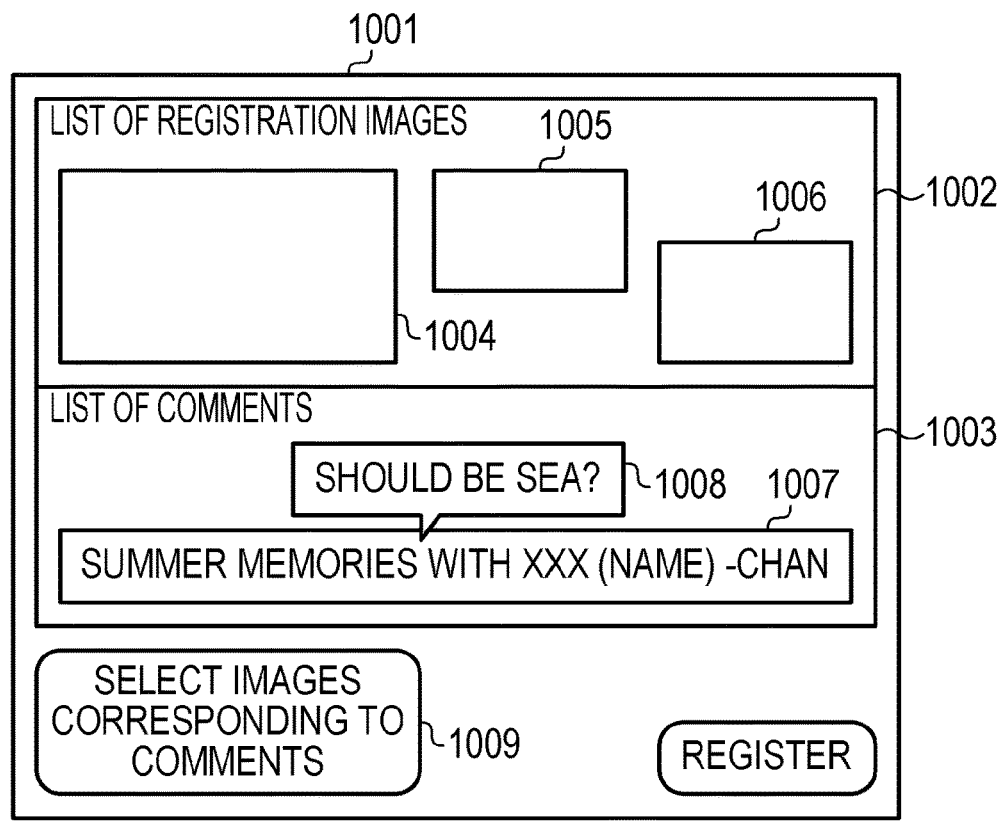
FIGS. 13A and 13B are diagrams showing a third display example of registration images and related text.
Figure 13B:
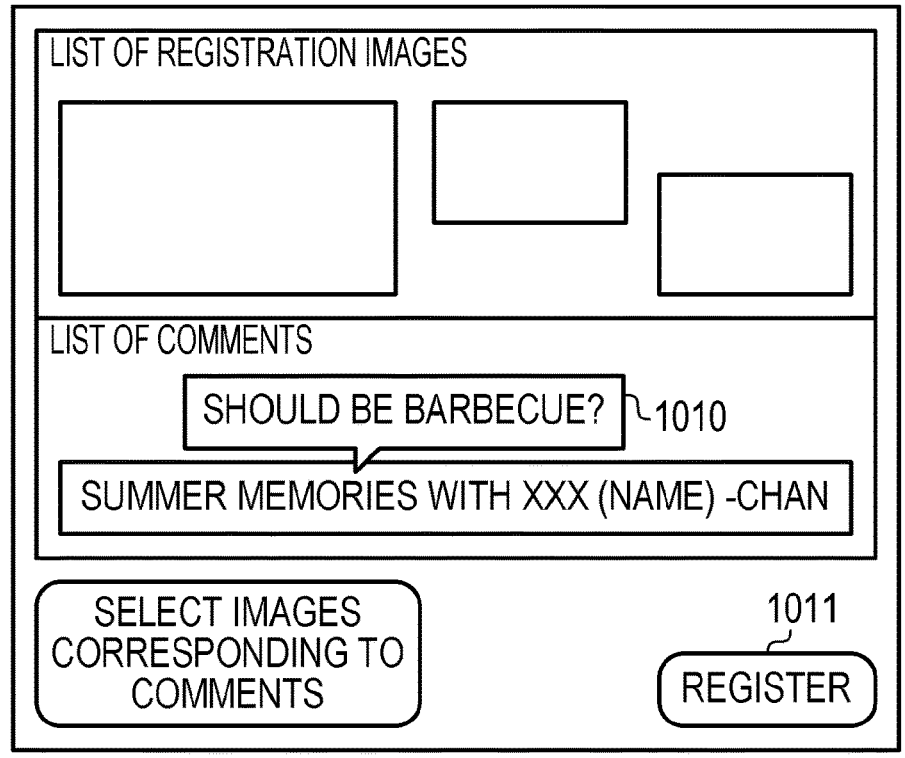

FIGS. 13A and 13B are diagrams showing a third display example of registration images and related text. The configuration of the screen 1001 will be described. The screen 1001 is a screen for receiving the input of one related text corresponding to a plurality of registration images.

Further, a region 1002 is a region for displaying a plurality of registration images. A region 1003 is a text input region for receiving the input of related text.

For example, a display unit 15 displays registration images 1004, 1005, and 1006 in the region 1002. The registration images 1004, 1005, and 1006 correspond to the registration images 503, 504, and 506 registered as shown in FIGS. 8A and 8B, respectively. Further, the registration images 1004, 1005, and 1006 are registered in the image information table 1201 (see FIG. 15).

Further, the display unit 15 displays a text input region 1007 in the region 1003. The information-processing apparatus 150 receives related text input via a keyboard or related text registered in an external storage device 104 or the like in the text input region 1007. Then, a text information acquisition unit 12 analyzes the received related text to acquire text information. The text information acquisition unit 12 stores the related text and the text information acquired from the related text in a text information table 1211 of a storage unit 20 (see FIG. 15). Note that the data structure of the text information table 1211 will be described later.

A button 1011 is a button for ending the input and the edit of the related text. When the button 1011 is pressed by the user, the information-processing apparatus 150 closes the screen 1001 to end the edit of the related text.

Figure 14A:
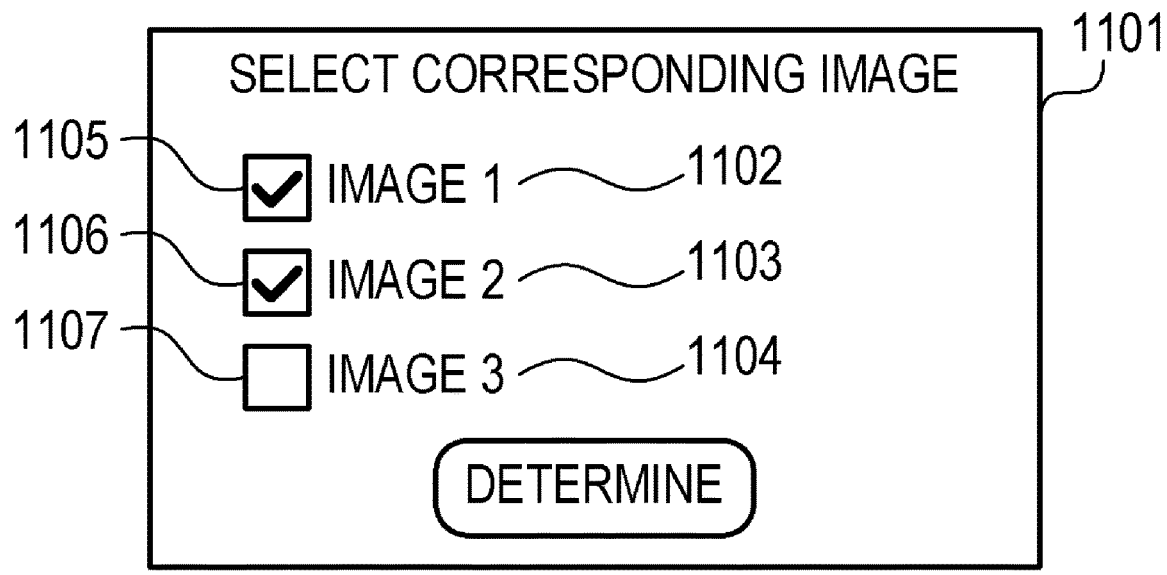
FIGS. 14A and 14B are diagrams showing an example of a selection screen for selecting registration images corresponding to related text.
Figure 14B:
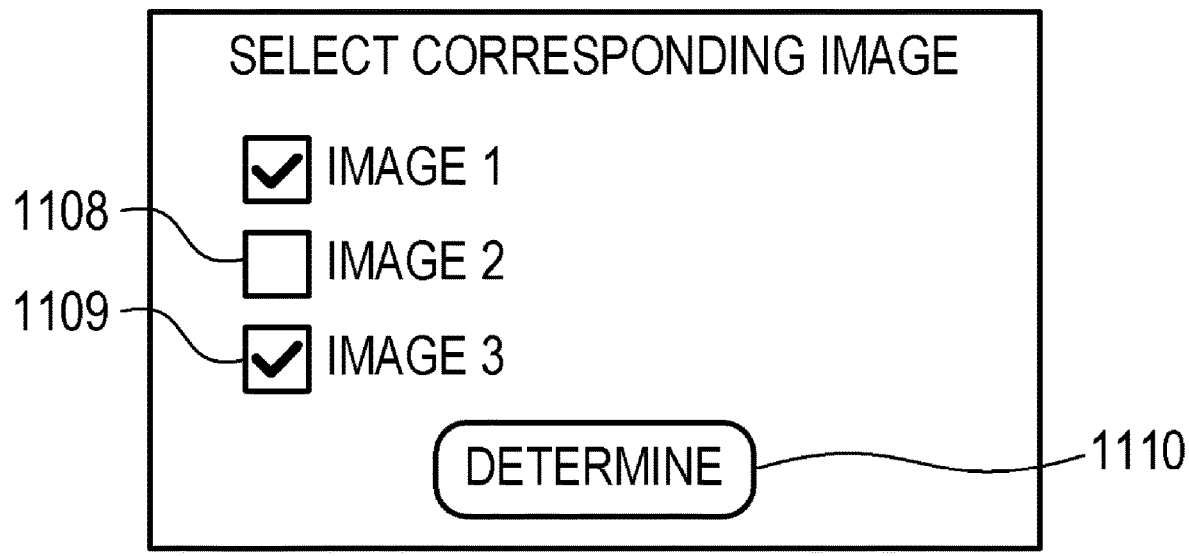

FIGS. 14A and 14B are diagrams showing an example of a selection screen for selecting registration images corresponding to related text.

The selection of registration images corresponding to related text will be described with reference to FIGS. 14A and 14B. When a button 1009 shown in FIG. 13A is pressed by the user, the information-processing apparatus 150 causes the image names (for example, the file names) of respective registration images to be displayed on a screen 1101.

For example, items 1102, 1103, and 1104 are displayed on the screen 1101 as the image names of the respective registration images. The item 1102 is the file name of the registration image 1004. Further, the item 1103 is the file name of the registration image 1005. Further, the item 1104 is the file name of the registration image 1006.

Check boxes 1105, 1106, and 1107 correspond to the items 1102, 1103, and 1104, respectively. For example, the registration images 1004 and 1005 are put into a checked status in FIG. 14A, and the registration images 1004 and 1006 are put into a checked status in FIG. 14B.

Only registration images put into a checked status are targets for detecting a mismatch with related text by a mismatch detection unit 13.

When a button 1110 is pressed by the user, the information-processing apparatus 150 closes the screen 1101.

Data Structures of Tables

FIG. 15 shows diagrams of second structural examples of the tables of image information and text information. In the image information table 1201, image IDs 1202, image data 1203, checked targets 1204, image names 1205, shooting dates and times 1206, shooting locations 1207, and object names 1208 are associated with each other. The image information table 1201 is different from the image information table 801 shown in FIG. 11 in that the image information table 1201 has the checked targets 1204.

The checked targets 1204 indicate whether registration images have been put into a checked status. For example, when registration images have been put into a checked status in FIGS. 14A and 14B, "target" is stored in the checked targets 1204. Further, when the registration images have not been put into a checked status in FIGS. 14A and 14B, "nontarget" is stored in the checked targets 1204.

In the text information table 1211, related text 1212, a shooting date and time 1213, a shooting location 1214, and an object name 1215 are associated with each other. The text information table 1211 is different from the text information table 811 in that the text information table 1211 has only one record.

The shooting date and time 1213, the shooting location 1214, and the object name 1215 of the text information table 1211 are items that are to be compared with the shooting dates and times 1206, the shooting locations 1207, and the object names 1208 of the image information table 1201, respectively.

Flow of Processing

Figure 16:
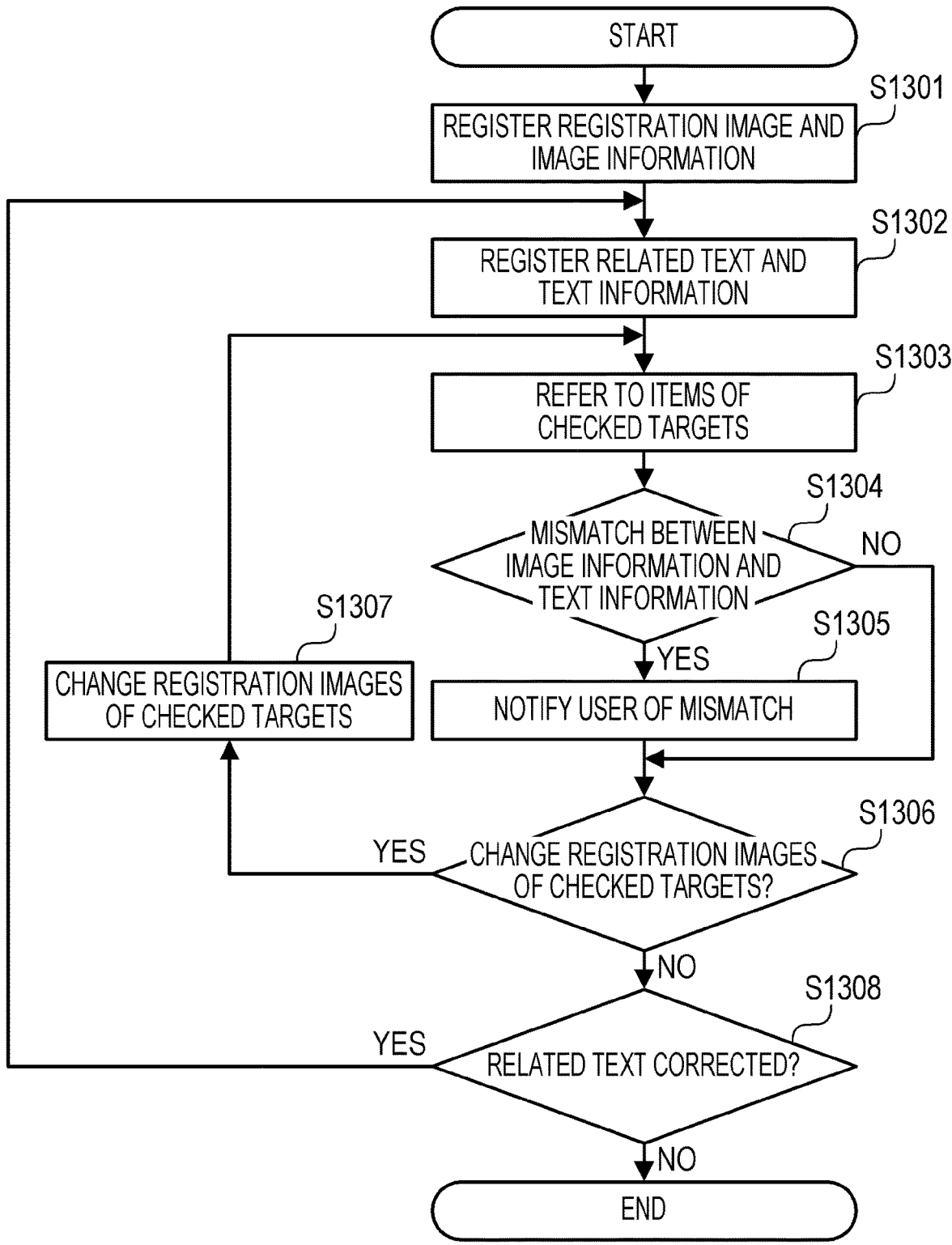
FIG. 16 is a diagram showing an example of the flow of processing by an information-processing apparatus according to a third embodiment.

FIG. 16 is a diagram showing an example of the flow of processing by the information-processing apparatus 150 according to the third embodiment. When the button 507 displayed on a screen 501 shown in FIGS. 8A and 8B is pressed by the user, the information-processing apparatus 150 acquires respective registration images and registers the same in the image information table 1201. Further, the information-processing apparatus 150 initially registers the items of checked targets in the records of the respective registration images as "target". Note that the registration of the items of the checked targets of respective image data as "target" or "nontarget" may be set in advance.

Next, the image information acquisition unit 11 acquires image information from the acquired respective registration images and registers the same in the image information table (step S1301). For example, the image information acquisition unit 11 acquires object names from the acquired image data according to an image analysis.

Further, the image information acquisition unit 11 acquires shooting dates and times and shooting locations from meta information on the acquired image data. The image information acquisition unit 11 registers the acquired object names, the shooting dates and times, and the shooting locations in the same records of the image information table 1201 in association with each other.

Then, the information-processing apparatus 150 performs a transition to the screen 1001 shown in FIG. 13A. Next, the text information acquisition unit 12 acquires related text input in the text input region 1003 of the screen 1001 shown in FIG. 13A. Then, the text information acquisition unit 12 acquires text information such as a shooting date and time, a shooting location, and an object name from the acquired related text and registers the same in the same record of the text information table 1211 in association with each other (step S1302).

Next, the mismatch detection unit 13 refers to the image information on the respective records registered as "target" in the items of the checked targets of the image information table 1201 and the text information in the record of the text information table 1211 (step S1303). Then, the mismatch detection unit 13 compares the respective image information with the text information and determines whether a mismatch between the respective image information and the text information occurs according to results of the comparison (step S1304).

When the mismatch between the image information and the text information is detected (YES in step S1304), the notification information generation unit 14 generates a comment according to the item of the registration image in which the mismatch has been detected and causes the display unit 15 to display the comment in the text input region 1003 (step S1305).

For example, as shown in FIG. 13A, the object name of the registration image 1004 is "sea," while the object name in the text input region 1007 is "xxx (name)-chan." In this case, the notification information generation unit 14 causes "Should be sea?" to be displayed as the comment 1008.

Further, the object name of the registration image 1005 is "barbecue," while the object name in the text input region 1007 is "xxx (name)-chan." In this case, as shown in FIG. 13B, the notification information generation unit 14 causes "Should be barbecue?" to be displayed as the comment 1010.

On the other hand, when a mismatch between the image information and the text information is not detected (NO in step S1304), the notification information generation unit 14 does not cause a comment to be displayed.

Next, the information-processing apparatus 150 determines whether there is a need to change the registration images of the checked targets among the plurality of registration images (step S1306). For example, when the button 1009 shown in FIG. 13A is pressed by the user, the information-processing apparatus 150 determines that there is a need to change the registration images of the checked targets (YES in step S1306) and causes the screen 1101 shown in FIG. 14A to be displayed.

The information-processing apparatus 150 changes the items of the "checked targets" in the image information table 1201 according to the presence or absence of a check in the check boxes of the screen 1101 (step S1307). Further, when the button 1110 shown in FIG. 14B is pressed by the user, the information-processing apparatus 150 determines the items of the checked targets in the image information table 1201 and returns to the processing of step S1303. Thus, a comment is displayed according to the registration images specified as the checked targets.

On the other hand, when the button 1011 shown in FIG. 13B is pressed by the user, the information-processing apparatus 150 determines that there is no need to change the registration images of the checked targets (NO in step S1306) and does not change the comment.

Then, the information-processing apparatus 150 determines whether the related text has been corrected (step S1308). When the related text has been corrected (YES in step S1308), the information-processing apparatus 150 returns to the processing of step S1302 to perform the above processing on the corrected related text. On the other hand, when the related text has not been corrected (NO in step S1308), the information-processing apparatus 150 ends the processing to end the registration of the related text.

As described above, even in a case in which one related text is input with respect to a plurality of registration images, an appropriate comment is output so that the related text adapted to the respective registration image is input.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the present invention also includes a case in which a software program for realizing the functions of the above embodiments is supplied to a system or an apparatus having a computer capable of running the program directly from a recording medium or using wired/wireless communication to be run.

Accordingly, a program code itself supplied to and installed in a computer for realizing the function processing of the present invention with the computer also realizes the present invention. That is, the present invention also includes a computer program itself for realizing the function processing of the present invention.

In this case, a program may have any form such as an object code, a program run by an interpreter, and script data supplied to an OS so long as the functions of the program are offered.

As a recording medium for supplying a program, a hard disk, a magnetic recording medium such as a magnetic tape, an optical/magnetic optical recording medium, or a non-volatile semiconductor memory may be, for example, used.

Further, as the procedure of a method for supplying a program, a computer program forming the present invention is registered in advance in a server on a computer network. Then, a connected client computer downloads and programs the computer program.

Further, the respective function units of the apparatuses of the respective embodiments may or may not be separate hardware. The functions of two or more function units may be realized by common hardware. Each of a plurality of functions of one function unit may be realized by separate hardware. Two or more functions of one function unit may be realized by common hardware. Further, respective function units may or may not be realized by hardware. For example, the apparatuses may have a processor and a memory storing a control program. Further, the functions of at least some of the function units of the apparatuses may be realized when a processor reads a control program from a memory and runs the same.

The above second and third embodiments describe the data structures of the text information tables, but the present invention is not limited to the data structures. For example, a text information table may include an item relating to the position of each text information. The display unit 15 displays a comment in association with the position of text information in which a mismatch has been detected. For example, the display unit 15 may display the tip of a balloon-displayed image for displaying a comment, at the position of text information in which a mismatch has been detected.

Thus, a user is allowed to be easily notified of a position at which the occurrence of a mismatch has been detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-225438, filed on Nov. 18, 2016, which is hereby incorporated by reference herein in its entirety.

What is claimed is:

1. An information-processing apparatus comprising:
a processor; and a memory storing a program which, when executed by the processor, causes the information-processing apparatus to:

input text data in response to an operation by a user;

store the text data relating to an image file in a storage region;

acquire information on a predetermined item as image information from the image file;

compare the image information with the text data relating to the image file;

generate a notification based on the image information if a result of the comparison indicates a mismatch between the image information and the text data, the notification including a correction of the mismatch based on the image information; and display the notification to notify the user the mismatch and the correction of the mismatch;

wherein the predetermined item is an image attribute selected from a plurality of image attributes stored in the image file and the comparison is performed in accordance with the predetermined item.

2. The information-processing apparatus according to claim 1, wherein
the image attributes include at least one of a shooting date and time, a shooting location, and an object name of the image.

3. The information-processing apparatus according to claim 1, wherein
the image information is acquired by performing an image analysis on image data of the image file.

4. The information-processing apparatus according to claim 1, wherein
the image information is acquired from meta information on the image file.

5. The information-processing apparatus according to claim 1, wherein
information on the predetermined item selected by the user is acquired as the image information.

6. The information-processing apparatus according to claim 1, wherein
the image information is acquired from an image file selected by the user in a plurality of image files.

7. The information-processing apparatus according to claim 1, wherein
the program, when executed by the processor, further causes the information-processing apparatus to correct the text data based on the image information according to an instruction from the user.

8. The information-processing apparatus according to claim 1,
wherein the notification is displayed in an input region of the text data in which the mismatch has been detected.

9. The information-processing apparatus according to claim 1,
wherein the notification is generated in a specified format.

10. The information-processing apparatus according to claim 1,
wherein the notification is displayed as a balloon.

11. The information-processing apparatus according to claim 1, wherein
when the result of the comparison indicates that the image information and the text data are not different from each other and the mismatch between the items does not occur, the notification is not generated.

12. The information-processing apparatus according to claim 1, wherein the processor further causes the information-processing apparatus to display a selection screen to the user to select an image attribute as the predetermined item from the plurality of image attributes.

13. The information-processing apparatus according to claim 12, wherein the processor further causes the information-processing apparatus to perform the comparison based on an updated status of the selection screen in accordance with the user's selection operation.

14. The information-processing apparatus according to claim 1, wherein the selected image attribute is a comparison target for detecting the mismatch.

15. The information-processing apparatus according to claim 1, wherein the notification is generated according to the comparison based on the selected predetermined item by the user.

16. A control method for an information-processing apparatus, comprising:

inputting text data in response to an operation by a user;

storing the text data relating to an image file in a storage region;

acquiring information on a predetermined item as image information from the image file;

comparing the image information with the text data relating to the image file; and generating a notification based on the image information if a result of the comparison indicates a mismatch between the image information and the text data, the notification including a correction of the mismatch based on the image information; and displaying the notification to notify the user the mismatch and the correction of the mismatch;

wherein the predetermined item is an image attribute selected from a plurality of image attributes stored in the image file and the comparison is performed in accordance with the predetermined item.

17. A non-transitory computer readable medium that stores a program, wherein the program causes a computer to execute:

inputting text data in response to an operation by a user;

storing the text data relating to an image file in a storage region;

acquiring information on a predetermined item as image information from the image file;

comparing the image information with the text data relating to the image file; and generating a notification based on the image information if a result of the comparison indicates a mismatch between the image information and the text data, the notification including a correction of the mismatch based on the image information; and displaying the notification to notify the user the mismatch and the correction of the mismatch;

wherein the predetermined item is an image attribute selected from a plurality of image attributes stored in the image file and the comparison is performed in accordance with the predetermined item.

\* \* \* \* \*